United States Patent
Czarnecki et al.

[11] Patent Number: 5,835,060
[45] Date of Patent: Nov. 10, 1998

[54] SELF-RESOLVING LBI TRIANGULATION

[75] Inventors: Steven V. Czarnecki, Apalachin; James A. Johnson, Newark Valley; Clifford M. Gray, Owego; George A. VerWys, Vestal; Carl Gerst, Skaneateles, all of N.Y.

[73] Assignee: Lockheed Martin Corporation, Bethesda, Md.

[21] Appl. No.: 731,191

[22] Filed: Oct. 7, 1996

[51] Int. Cl.⁶ .................................................. G01S 5/04
[52] U.S. Cl. .......................... 342/442; 342/424; 342/444; 342/457
[58] Field of Search .................................. 342/417, 424, 342/442, 444, 457

[56] References Cited

U.S. PATENT DOCUMENTS

| | | | |
|---|---|---|---|
| 3,789,410 | 1/1974 | Smith et al. | 343/112 D |
| 3,863,256 | 1/1975 | Smith | 343/112 R |
| 3,947,803 | 3/1976 | Brown | 340/6 R |
| 4,417,248 | 11/1983 | Mathews | 343/16 M |
| 4,546,355 | 10/1985 | Boles | 343/17 |
| 4,639,733 | 1/1987 | King et al. | 342/424 |
| 4,910,526 | 3/1990 | Donnangelo et al. | 342/455 |
| 5,343,212 | 8/1994 | Rose et al. | 342/424 |
| 5,406,291 | 4/1995 | Guerci et al. | 342/451 |

FOREIGN PATENT DOCUMENTS

| | | | |
|---|---|---|---|
| 2104753 | 7/1981 | United Kingdom | G01S 13/42 |

*Primary Examiner*—Thomas H. Tarcza
*Assistant Examiner*—Dao L. Phan
*Attorney, Agent, or Firm*—Lane Aitken & McCann

[57] ABSTRACT

In a long base line interferometer system for determining the position of a transmitter, the phase differences between the signal received by the antennas at each end of the base line are monitored as the interferometer moves through a measurement path to obtain phase difference measurements distributed along the measurement path. A cost function involving measuring the sum of the squares of the differences between measured values and predicted values is determined for each of a set of trial location grid points and the grid point with the lowest cost function is selected as a starting point for determining the transmitter location by least squares convergence. In evaluating the cost function, the predicted values are obtained from the equation:

$$\phi = \left[ \phi_0 + \frac{2\pi L}{\lambda} \cos\theta \right] \mod 2\pi$$

in which $\phi_0$ is unknown phase offset and the X and Y coordinates of the transmitter are unknown. The least squares convergence is carried out by iteratively adding corrections to predicted values for the unknowns until convergence occurs.

10 Claims, 7 Drawing Sheets

SELF-RESOLVING LBI TRIANGULATION

This application is related to application Ser. No. 60/005, 071 filed Oct. 6, 1995.

This invention relates to a system for estimating from a moving platform the location of a transmitter of electromagnetic waves or acoustic waves using a long base line interferometer (LBI).

BACKGROUND OF THE INVENTION

Conventional techniques of estimating the location of a transmitter, such as a direction finding (DF) triangulation, make line of bearing (LOB) measurements, while the relative position of the transmitter and the platform, from which the estimation is made, changes. By knowing the geographic coordinates of the platform, the geographic coordinates of the transmitter can be determined. In order to obtain an accurate estimate of the location of the transmitter from LOB measurements, there needs to be a substantial relative cross range motion between the platform and the transmitter and this cross range motion requires time for the motion to be carried out. Because there is a need to obtain the transmitter location in a minimum amount of time, other forms of transmitter location estimation have been developed. One such system employs an LBI interferometer which employs two signal receivers such as antennas spaced from each other on a base line which has a length several times the wavelength of the transmitter. The difference between the phases of the signals received by the antennas on the base line provides an indication of the direction of the vector between the platform and the transmitter and the range of the transmitter, but with a high degree of ambiguity. Prior to this invention, different techniques have been employed to resolve this ambiguity. One prior art system employs a short base line interferometer phase measurement in addition to the LBI measurement to resolve the ambiguity. Another prior art system makes an independent measurement of the angle of arrival of the transmitted signal in order to resolve the ambiguity and also makes use of Kalman filters to arrive at a solution.

The present invention improves on the LBI systems of the prior art.

SUMMARY OF THE INVENTION

In accordance with the invention, the phase differences at the two antennas at the LBI are monitored to obtain repetitive phase difference measurements. The measured phase difference corresponds to the angle of arrival of the transmitted signal plus an unknown constant minus an unknown integer multiple of $2\pi$. The measured phase difference (in radians) can be expressed as follows:

$$\phi = \left[ \phi_0 + \frac{2\pi L}{\lambda} \cos\theta \right] mod 2\pi$$

in which $\phi$ is the measured phase difference, $\phi_0$ is an unknown constant, L is the length of the baseline of the LBI antenna, $\lambda$ is the wavelength of the transmitted signal and $\theta$ is the angle of arrival of the transmitted signal relative to the LBI base line.

In accordance with the invention, to determine the location of the transmitter, a cost function is evaluated to select one of a set trial grid points for the transmitter. The position of the transmitter is then estimated by least squares convergence using the selected trial grid point as a starting point.

DESCRIPTION OF THE PREFERRED EMBODIMENT

Figure 1:
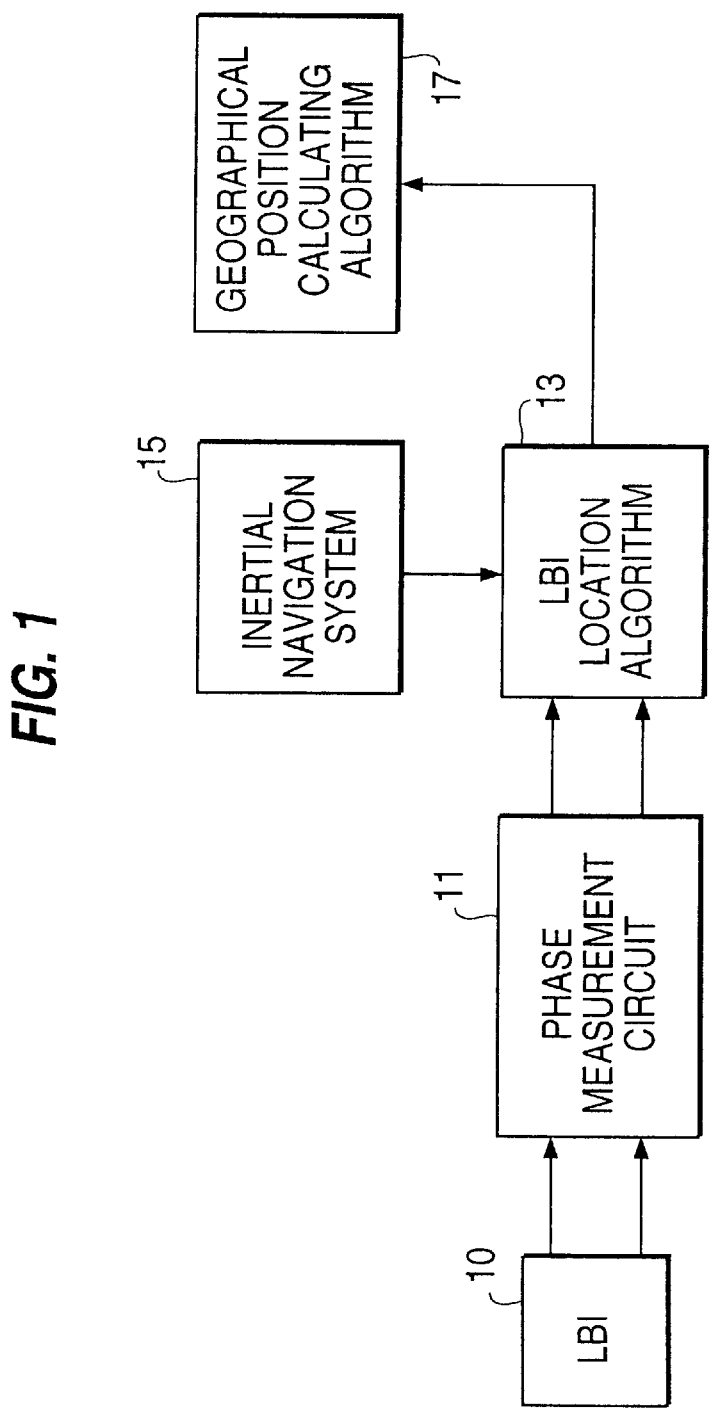
FIG. 1 is a block diagram illustrating the invention.

As shown in the block diagram of FIG. 1, the signals received at each antenna of the LBI 10 are applied to a phase measurement circuit 11 which generates an output signal representing the measured phases, which are subtracted to provide phase difference measurements. These phase differences are subjected to the LBI location algorithm 13 of the invention to provide the XY coordinates of the position of the transmitter. The platform, which will usually be an aircraft, is provided with an inertial navigation system 15 which continuously determines the position and orientation of the platform. The information provided by the inertial navigation system is used in the algorithm to determine the position of the transmitter.

Figure 2:
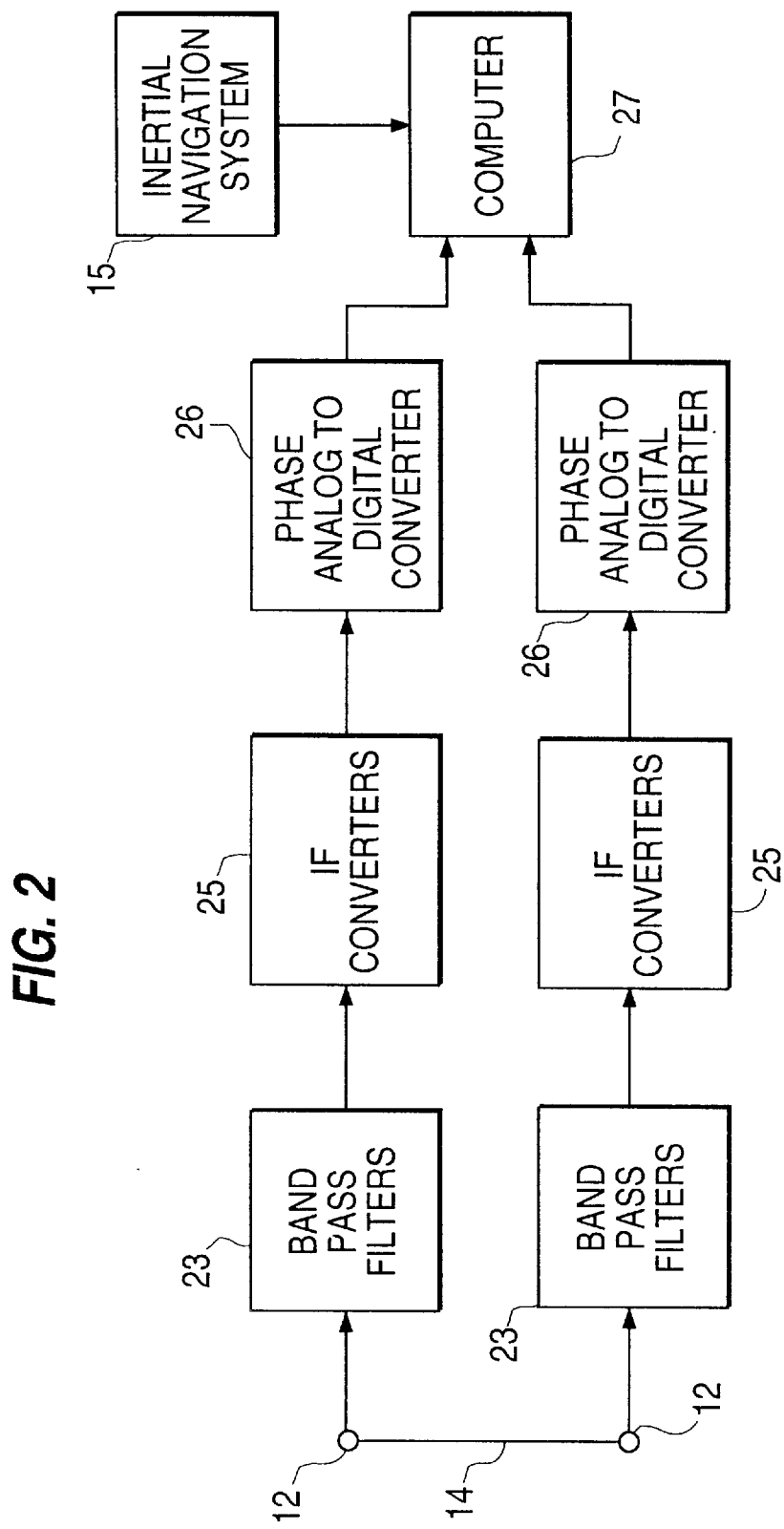
FIG. 2 is a block diagram of the hardware of the invention.

The hardware of the system as shown in FIG. 2 comprises two receiving antennas, called apertures 12, which are separated by the base line 14. The base line 14 has a length between the two receiving apertures 12 of L. In the specific embodiment of the invention, the transmitter is assumed to be a radio frequency transmitter transmitting on a fundamental frequency range between 0.5 gigahertz and 18 gigahertz. The received signals are multiplexed through bandpass filters 23 and applied to intermediate frequency converters 25 which convert the high frequency input signals through several stages to 160 megahertz intermediate signals. The intermediate 160 megahertz signals are applied to a phase analog-to-digital converters which convert the phases of the applied signal to a digital values. The phase analog-to-digital converters may be as disclosed in U.S. Pat. No. 4,405,895. The digital value representing the phase of each of the intermediate frequency signals is then applied to a computer 27 which contains the algorithm computing geographical coordinates of the transmitter.

Figure 3A:
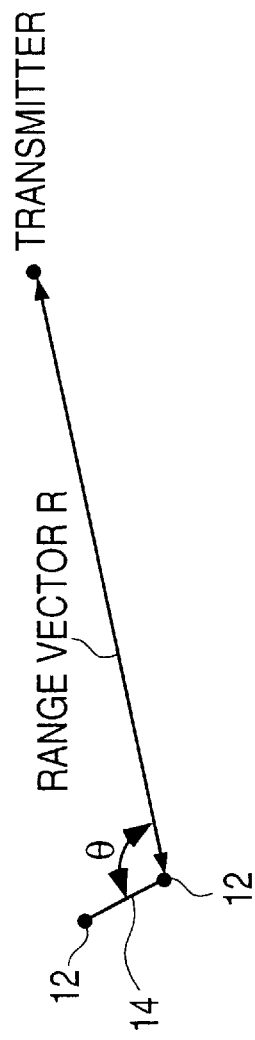
FIG. 3A is a diagram illustrating how an LBI inferometer detects a transmitted signal.
Figure 3B:
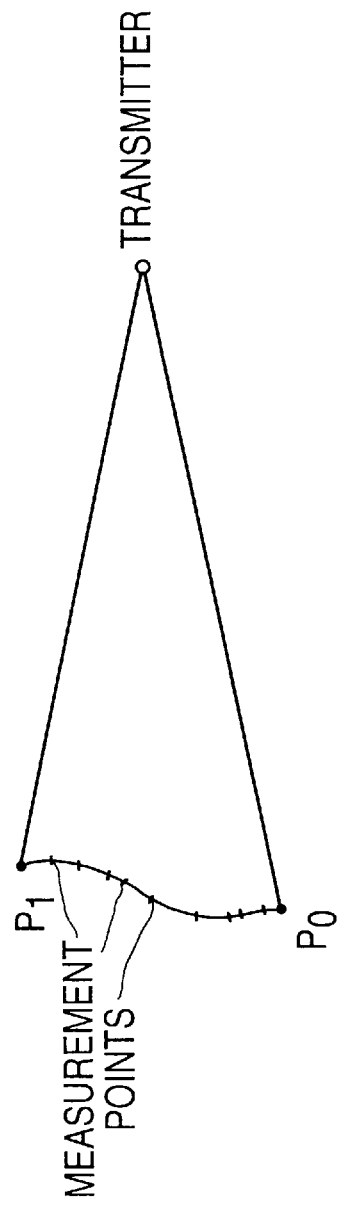
FIG. 3B is a diagram illustrating how the LBI interferometer of the present invention is employed to detect the position of a transmitter.

The fundamental measurement made by the long base interferometer is a phase angle difference between the signals received by the two antennas 12. This phase angle can be represented as follows:

$$\phi = \left[ \phi_o + \frac{2\pi L}{\lambda} \cos\theta \right] mod 2\pi \qquad (1)$$

in which $\phi$ is the measured phase angle, $\phi_0$ is an unknown phase offset due to effects such as uncalibrated phase mismatches in the receiving system, L is the base line length in the interferometer, or, in other words, the distance between the two apertures of the long base line interferometer, $\lambda$ is the fundamental wavelength of the transmitted frequency, and θ is the bearing of the transmitter relative to the interferometer base line. In vector notation, the expression of Equation (1) can be rewritten as follows:

$$\phi = \left[ \phi_o - \frac{2\pi}{\lambda} \overline{L} \cdot \overline{u}_R \right] \mod 2\pi \quad (2)$$

in which $\overline{L}$ is a vector representing the base line length and orientation and $\overline{U}_R$ is a unit vector extending in the direction of the platform carrying the long base line interferometer from the transmitter. FIG. 3A shows the initial position of the platform with the base line at angle θ and having the antennas 12 at opposite ends of the base line. As shown in FIG. 3A, the base line is at an angle θ to the vector representing the direction and range $\overline{R}$ from the transmitter to the interferometer. FIG. 3B illustrates the example showing the motion of the platform through a measurement path from $p_0$, to point $p_1$. The LBI position algorithm uses successive measurements of the phase angle as the platform moves through the measurement path relative to the transmitter to determine the XY coordinates of the transmitter and the value $\phi_0$. The phase angle measurements are thus distributed along the measurement path at measurement points. The measurement points are not required to be uniformly distributed along the measurement path.

Figure 4:
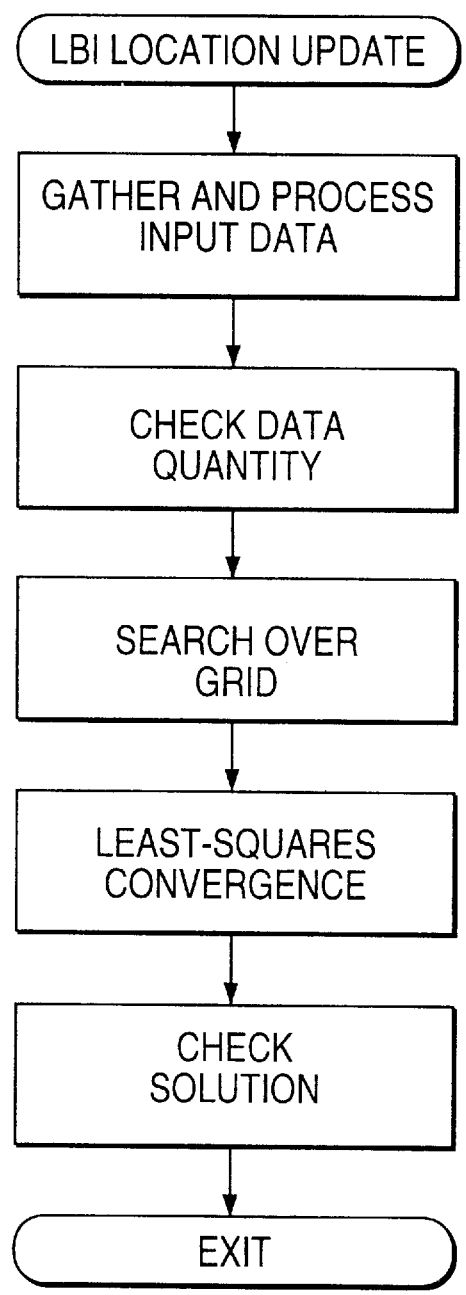
FIG. 4 is a flow chart illustrating the process employed in the specific embodiment of the invention.

FIG. 4 is a flow chart of the computer program employed in the computer of the system to determine the position of the transmitter. A source code listing of this program in C is attached hereto as an Appendix.

As shown in FIG. 4, the first step of the location determining program is to gather and process the input data. As pointed out above, the data is in the form of digital data representing the phases detected by the apertures of the LBI interferometer. In the gather and process data step, the data is organized into a series of phase difference measurements $\phi_i$ through $\phi_n$ obtained as the platform travels through a flight path at an angle to the range vector $\overline{R}$ extending between the transmitter and the platform. Following the gather and process data step, the quantity of data is checked to insure that sufficient data is present to make an accurate determination of the transmitter position. Then following the step of checking the data quantity, the program performs the search over grid step in which a multiplicity of grid points distributed on the left and right sides of the boresight of the interferometer are defined, the boresight being perpendicular to the base line of the interferometer and located at a selected position on the base line, such as at one of the apertures. For example, the grid points could be distributed at ranges of 10, 15, 20, 30, 50 and 80 kilometers from the platform and at 3 degree angle increments distributed over a 180 degree angle range from −90° from the boresight to +90° from the boresight. Then, in the search over grid step, one of the grid points is selected as the grid point having the greatest probability of being closest to the position of the transmitter. This selection is carried out by evaluating for each grid point a cost function in which predicted measurement-to-measurement phase differences for the LBI interferometer are subtracted from the actual measurement-to-measurement phase differences and these differences are converted to principal values, if necessary, squared and summed to generate the cost function. The grid point with the lowest cost function is selected as being the closest to the transmitter. After the grid point has been selected, the program enters into the least squares convergence step in which, using the selected grid point as a starting point, the location of the transmitter is estimated using a least squares convergence algorithm. Following this step, the solution is checked to complete the program. To check the solution, the program determines whether the cost function for the converged solution is reasonable for the expected phase measurement accuracy, that is, whether it is less than a selected maximum, whether the range is reasonable, that less than a selected maximum, and whether the solution is on the correct side of the aircraft. If two reasonable solutions are obtained which are of nearly equal cost and which are not colocated, the solutions are considered ambiguous. If the solution is not ambiguous and is determined to be reasonable, it is reported and displayed.

Figure 5:
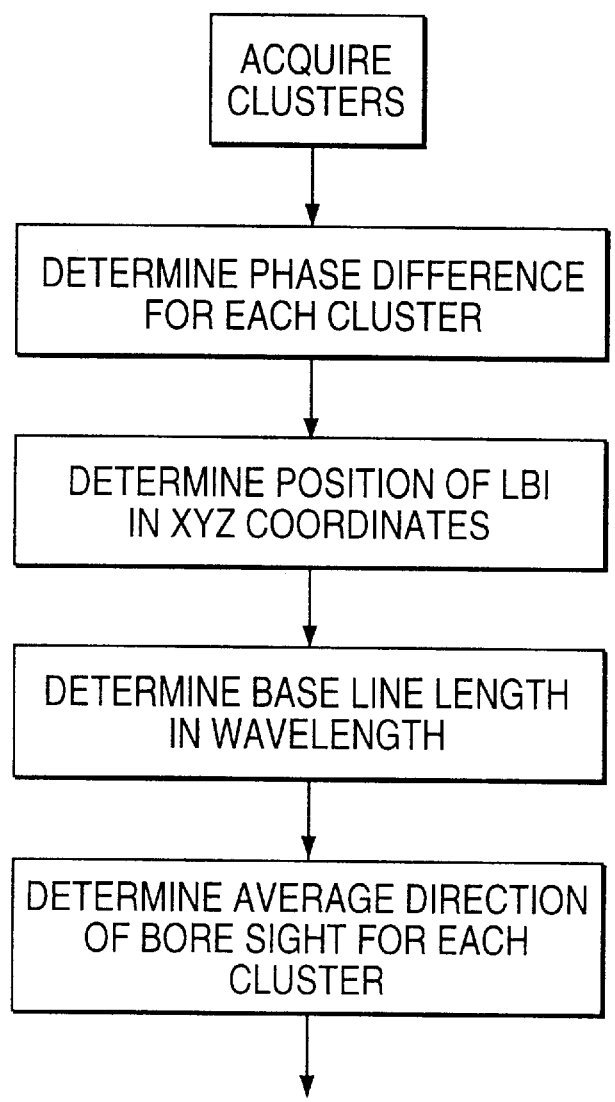
FIG. 5 is a flow chart illustrating the data acquisition part of the process employed in the specific embodiment.

As shown in FIG. 5, in the preferred embodiment of the invention, the gather and process data step involves acquiring a series of clusters of pulses from the transmitter over a measurement interval. Each cluster comprises a series of pulses received over a short time interval of a few milliseconds up to a hundred milliseconds. Navigational data provided by an inertial navigation system on the platform indicates the location of the force center of the platform at the time the cluster is received or, more specifically, at a time reference assigned specifically to the cluster. To obtain a measurement of the phase difference between the signals received at each antenna for a cluster, the phase difference for each pulse of the cluster is determined and then the phase difference for the cluster is calculated from these phase differences as will be described below. Before making this calculation, the phase differences for the cluster are unwrapped to accurately represent the relative phase difference throughout the cluster. It will be recalled the phase difference correlates with the ranges in the bearing in accordance with the modulo expression of Equation (1). Thus, as the phase difference changes from pulse to pulse over the cluster, it may abruptly change from a value near $2\pi$ to a value near zero or vice versa. The unwrapping eliminates this discontinuity in the data. To carry out the unwrapping, the value $2\pi$ is added or subtracted from the phase difference values so that the difference between successive phase differences from pulse to pulse of the cluster lies in the interval from $-\pi$ to $\pi$. After the phase unwrapping, the coefficients of a second order curve are determined by regression from the phase difference values of the cluster and then from the second order curve a phase difference for the cluster is determined to correspond with the phase difference at the time of the navigation tag assigned to the cluster. As shown in FIG. 5, in addition to determining the phase difference measurement for each cluster, the precise position of each antenna of the LBI is determined for each cluster from the navigation data determined by the inertial navigation system and assigned to the cluster as a navigation tag. The navigation data will provide the position of the force center of the platform at the time reference for the cluster. The position of each antenna in a common XYZ coordinate system is then determined for each of the two antennas of the LBI. The vector length of the base line is then computed in wavelengths of the detected transmitter signal. In addition, the average direction of the antenna bore sight is calculated for each cluster.

As a result of the gather and process input data step, a series of phase difference measurements $\phi_1$ through $\phi_n$, one for each cluster is determined. These phase difference measurements are distributed over the measurement interval and distributed along the measurement path that the platform travels during the measurement interval. The gathering and process input data step of the specific embodiment described above involving processing clusters of pulses is not a necessary part of the invention. Instead, the phase differences could be simply directly measured at a series of incremental discrete points as the platform moves along the measurement path during the measurement interval.

The purpose of the invention is to determine the XY coordinates of the transmitter from the detected phase difference measurement making use of Equation (1). Thus, the unknowns to be determined by the present invention, represented as $\bar{x}$, can be expressed as $\bar{X} = \{X, Y, \phi_0\}$.

Figure 6:
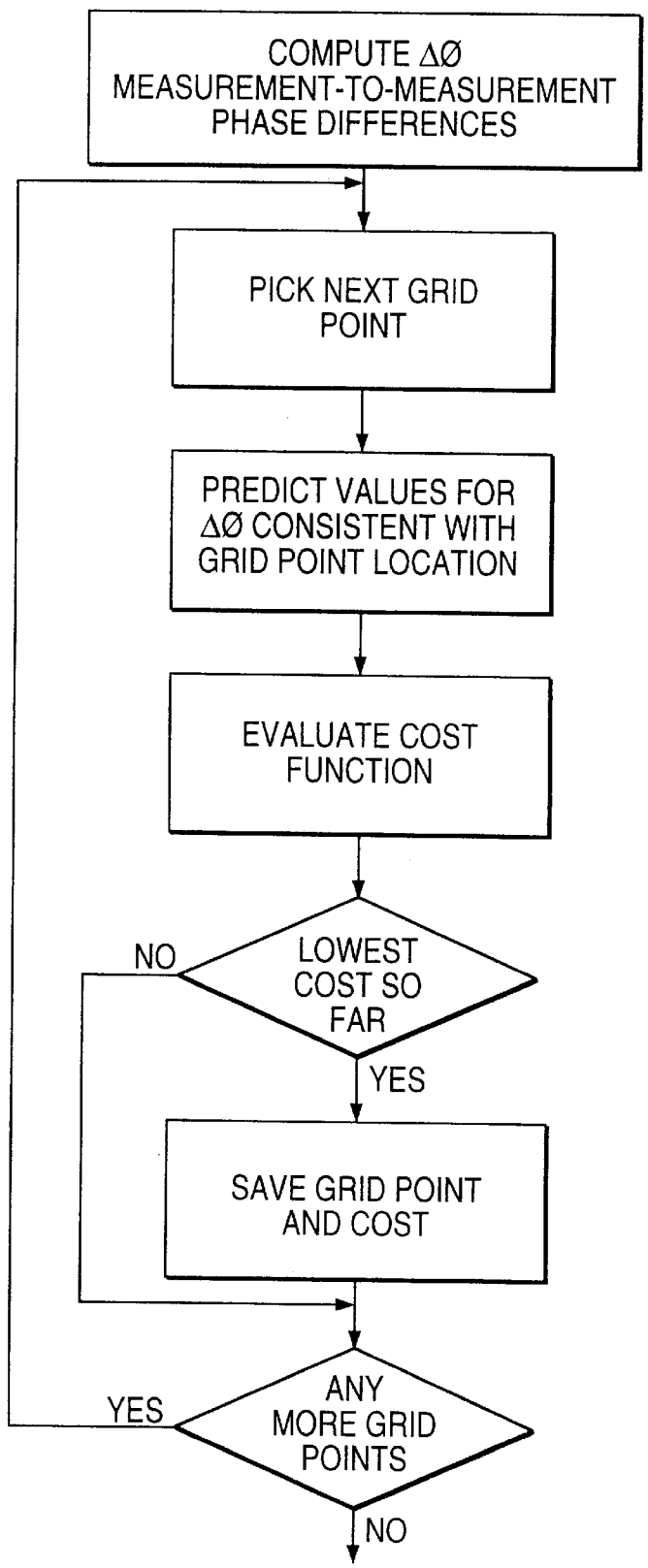
FIG. 6 is a flow chart of a part of the LBI location algorithm used to initially select a grid point as an estimated position of the transmitter.

The search over grid step is illustrated by the flow chart in FIG. 6. As shown in this figure, the first step in this process is to subtract each phase difference measurement $\phi_1$ through $\phi_n$ from the next successive difference measurement along the measurement path. Thus, the differential measurements $\Delta\phi_1$ though $\Delta\phi_{n-1}$ are determined in accordance with the expression $\Delta\phi_i = \phi_{i+1} - \phi_i$. This operation eliminates the unknown constant $\phi_0$ from the equation. To formulate a cost function for each of the grid points in the search over grid step, the series of differential phase differences $\Delta\hat{\phi}_1$ through $\Delta\hat{\phi}_{n-1}$ are predicted for each grid point. These predicted values represented as $\Delta\hat{\phi}_i$ are then subtracted from the measured values $\Delta\phi_i$ to obtain a set of residual values. The cost function to be evaluated is:

$$S = \Sigma \left[ (\pi + \Delta\phi_i - \Delta\hat{\phi}_i) \bmod 2\pi - \pi \right]^2 \quad (3)$$

The cost function is thus the sum of the squares of the residual values reduced to their principal value. The grid point with the lowest cost function is selected as the starting point for the next step of the process of locating the transmitter, which is the step of nonlinear least squares convergence.

The predicted phase difference values $\hat{\phi}$ are determined from Equation (1) and, accordingly, are a function of the predicted values of the unknowns $\bar{X} = \{X, Y, \phi_0\}$. Accordingly, the predicted phase differences can be expressed as a function of $\bar{x}$, i.e., $f(\bar{x})$.

Figure 7:
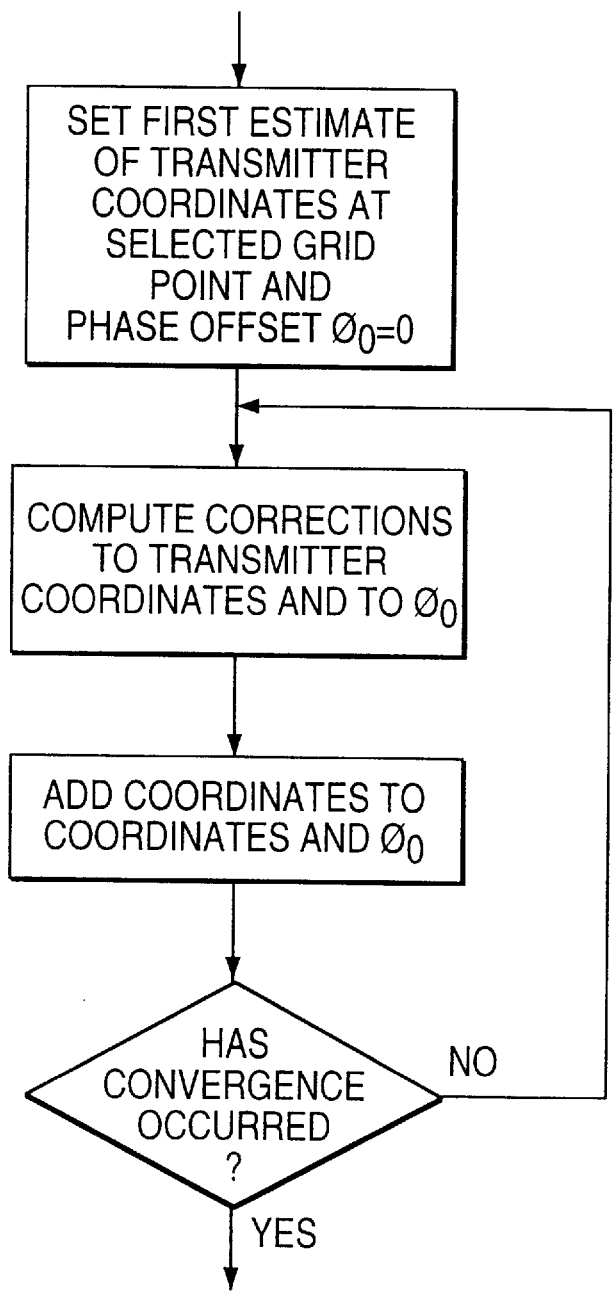
FIG. 7 is a flow chart of part of the LBI location algorithm used to determine the position of the transmitter by least squares convergence.

The least squares convergence part of the algorithm, illustrated by the flow chart of FIG. 7, involves reiteratively solving the equation:

$$\hat{\bar{x}}_{n+1} = \hat{\bar{x}}_n + \hat{\bar{x}} \quad (4)$$

until this equation stops converging.

In Equation (4), the symbol $\hat{\bar{x}}_n$ represents a set of predicted values for the unknowns $\bar{x} = \{X, Y, \phi_0\}$ and $\hat{\bar{x}}_{n+1}$ is the next set of predicted values for the set of unknowns $\bar{x}$ after correcting $\hat{\bar{x}}_n$ with the corrections $\overline{\Delta x}$. The corrections $\overline{\Delta x}$ represent a correction in each of the unknown X, Y and $\phi_0$. Accordingly, $\overline{\Delta x} = \{\Delta X, \Delta Y, \Delta\phi_0\}$. The grid point selected in the search over grid step is used as the starting point for the unknowns X and Y, and $\phi_0$, is initially set zero. The correction $\overline{\Delta x}$ is computed in accordance with:

$$\overline{\Delta x} = (H^T R^{-1} H)^{-1} H^{TR-1} \bar{z} \quad (5)$$

In the expression (5) for the correction $\overline{\Delta x}$, H is a matrix made of partial derivatives of $f(\bar{x})$ with respect to X, Y and $\phi_0$ determined analytically from Equation (1). More specifically:

$$H = \frac{\partial}{\partial \bar{x}} f(\bar{x}) \Big|_{\hat{\bar{x}}} \quad (6)$$

H is thus made up of the partial derivatives:

$$\frac{\partial f(\bar{x})}{\partial X}, \frac{\partial f(\bar{x})}{\partial Y}, \frac{\partial f(\bar{x})}{\partial \phi_o} \quad (7)$$

Each column of the matrix H is a vector of the partial derivatives evaluated at each measurement point of the measurement path based on the predicted values $\hat{\bar{x}}$ for such measurement point. In Expression (5), R is the covariance matrix for the phase measurements. $R = E[\xi_i \xi_j]$ where $\xi_i$ is the error in the phase measurement, $\phi_i$. As implemented, R is an input quantity to the location computation, having been estimated from measured signal parameters. In Expression (5), $\bar{z}$ is the vector of residual values determined by subtracting the predicted phase difference values $\hat{\phi}_1$ through $\hat{\phi}_n$ from the measured phase difference values $\phi_1$ through $\phi_n$. Thus, $\bar{z} = (z_1, z_2, \ldots z_n) = (\bar{\phi} - \hat{\bar{\phi}})$ wherein $\hat{\bar{\phi}} = (\hat{\phi}_1, \hat{\phi}_2 \ldots \hat{\phi}_n)$ and $\bar{\phi} = (\phi_1, \phi_2 \ldots \phi_n)$.

These computations give a value for $\overline{\Delta x} = (\Delta X, \Delta Y, \Delta\phi_0)$ which are the correction values are added to the starting values of X,Y at the selected grid point and added to $\phi_0$. The calculation is then iteratively repeated using the new corrected value of Xn in expression (4) until $\hat{\bar{x}}_n + \overline{\Delta x}$ converges. In this manner, the coordinates of the transmitter X and Y and the unknown $\phi_0$ are quickly determined after the platform moves through the measurement path.

After the position of the transmitter has been determined as described above, the position of the transmitter can be continuously tracked by using just the least squares convergence part of the algorithm and using the previously detected position of the transmitter as the starting position for the least squares calculation.

The specific embodiment described above detects the position of a radio transmitter from a moving platform, presumably an aircraft. The radio transmitter typically would be a radar transmitter, but the system can also be used with equal facility to determine the position of the transmitter of the radio signals used in communication. In addition, the system can be adapted to detect the position of a sonar transmitter or a sound signal by making the signal receivers of the LBI transducers for converting sound waves into electrical signals.

These and other modifications may be made to the specific embodiment of the invention without departing from the spirit and scope of the invention.

We claim:

1. A system for determining the location of a transmitter transmitting a signal having a wavelength comprising a mobile platform, signal receivers mounted on said platform to receive said signals, said receivers being separated by a baseline having a length greater than said wavelength, computer means to determine successive phase differences in the phases of the signals received by signal receivers as said platform moves through a measurement path transverse to the range between platform and said transmitter, said phase difference measurements being the phase differences at successive measurement points distributed along said measurement path, said computer means determining a cost function for a set grid point representing trial locations for said transmitter, said cost function being represented as:

$$\sum_{i=1}^{n} \left[ (\pi + \Delta\phi_i - \Delta\hat{\phi}_i) \bmod 2\pi - \pi \right]^2$$

wherein $\phi_i$ are the phase difference measurements at said successive measurement points and $\Delta\phi_i$ being the differences between successive measurements made at said measurement points, and $\hat{\phi}_{i,x}$ being the predicted values of $\Delta\phi_i$, said computer means determining the location of said transmitter by least squares convergence using the grid point with lowest cost function as a starting point.

2. A system as recited in claim 1 wherein said computer means determines $\Delta\hat{\phi}_i$ for each measurement point from the function:

$$\hat{\phi}_i = \left( \phi_0 - \frac{2\pi L}{\lambda} \cos\theta \right) mod 2\pi$$

wherein $\phi_0$ is an unknown constant, L is the length of the baseline, $\lambda$ is the wavelength of the transmitter signal and $\theta$ is the angle between the baseline and the range vector to the grid point.

3. A system as recited in claim 2 wherein the computation of said least squares convergence is determined in accordance with the convergence function:

$$\hat{\overline{x}}_{n+1} = \hat{\overline{x}}_n + \overline{\Delta x}$$

in which $\hat{\overline{x}}_n$ represents a predicted value for the unknowns comprising coordinates X and Y of the transmitter and the unknown constant $\phi_0$, $\hat{\overline{x}}_{n-1}$ is the next predicted value for said unknowns after adding the corrections $\overline{\Delta x} = \{\Delta X, \Delta Y, \Delta \phi_0\}$, and in which $\overline{\Delta x}$ is computed from:

$$\overline{\Delta x} = (H^T R^{-1} H)^{-1} H^T R^{-1} \overline{z}$$

in which H is a matrix of partial derivatives of the unknowns in the expression for determining the estimated values $\hat{\phi}_I$ and R is the covariance matrix of the phase measurement, said computer using the coordinates of the selected grid point as the starting values of X and Y in said convergence function and correcting the values of $\hat{\overline{x}}_n$ with $\overline{\Delta x}$ until $\hat{\overline{x}}_n + \overline{\Delta x}$ converges.

4. A system as recited in claim 1, wherein said least squares conversion is determined in accordance with the convergence function:

$$\hat{\overline{x}}_{n+1} = \hat{\overline{x}}_n + \overline{\Delta x}$$

in which $\overline{x}$ represents values for set of unknowns including the coordinates of the transmitter and an unknown constant $\phi_0$ in the equation for the phase differences being measured:

$$\phi = f(\overline{x}) = \left[ \phi_o - \frac{2\pi L}{\lambda} \cos\theta \right] mod 2\pi,$$

$\hat{\overline{x}}_n$ represents predicted values for said unknowns, $\hat{\overline{x}}_{n+1}$ represents the next predicted values for said unknowns after adding the corrections $$\overline{\Delta X} = \{\Delta X, \Delta Y, \Delta \phi_0\}$$

in which $\overline{\Delta x}$ is computed from $$\overline{\Delta x} = (H^T R^{-1} H)^{-1} H^T R^{-1} \overline{z}$$

in which $$H = \frac{\partial}{\partial \overline{x}} f(\overline{x}) \Big|_{\hat{\overline{x}}}$$

R is the covariance matrix of the phase measurements and $\overline{z}$ is a vector of the residual differences between the phase difference measurements $\phi$ and the predicted measurements $\hat{\phi}$ at each measurement point.

5. A system for determining the location of a transmitter transmitting a signal having a wavelength comprising a mobile platform, signal receivers mounted on said platform to receive said signals, said receivers being separated by a baseline having a length greater than said wavelength, computer means to determine successive phase differences in the phases of the signals received by signal receivers as said platform moves through a measurement path, said phase difference measurements being the phase differences at successive measurement points distributed along said measurement path, said computer means determining the location of said transmitter by least squares convergence function:

$$\hat{\overline{x}}_{n+1} = \hat{\overline{x}}_n + \overline{\Delta X}$$

in which $\overline{x}$ represents values for set of unknowns including the coordinates of the transmitter and an unknown constant $\phi_0$ in the equation for the phase differences being measured:

$$\phi = f(\overline{x}) = \left[ \phi_o - \frac{2\pi L}{\lambda} \cos\theta \right] mod 2\pi,$$

$\hat{\overline{x}}_n$ represents predicted values for said unknowns, $\hat{\overline{x}}_{n+1}$ represents the next predicted values for said unknowns after adding the corrections $$\overline{\Delta x} = \{\Delta X, \Delta Y, \Delta \phi_0\}$$

in which $\overline{\Delta x}$ is computed from $$\overline{\Delta x} = (H^T R^{-1} H)^{-1} H^T R^{-1} \overline{z}$$

in which $$H = \frac{\partial}{\partial \overline{x}} f(\overline{x}) \Big|_{\hat{\overline{x}}}$$

R is the covariance matrix of the phase measurements and $\overline{z}$ is a vector of the residual differences between the phase difference measurements $\phi$ and the predicted measurements $\hat{\phi}$ at each measurement point.

6. A method of locating a transmitter transmitting a signal having a wavelength comprising receiving said signal with receivers separated by a baseline longer than said wavelength, moving said receivers separated by said baseline through a measurement path, detecting the phase differences between signals received by said receivers at measurement points distributed along said measurement path, determining with a computer a cost function for a set of grid points representing trial locations for said transmitter, said cost function being represented as $$\sum_{i=1}^{n} [(\pi + \Delta \phi_i - \Delta \hat{\phi}_i) mod 2\pi - \pi]^2$$

wherein $\phi_i$ are the phase difference measurements at said successive measurement points, $\Delta \phi_i$ being the differences between successive measurements made at said measurement points, and $\Delta \hat{\phi}_i$ being the predicted values of $\Delta \phi_i$, and determining with said computer the location of said transmitter by least squares convergence using the grid point with the lowest cost function as a starting point.

7. A method as recited in claim 6 wherein $\hat{\phi}_I$ for each measurement point is determined from the function:

$$\hat{\phi}_i = \left( \phi_o - \frac{2\pi L}{\lambda} \cos\theta \right) mod 2\pi$$

wherein $\phi_0$ is an unknown constant, L is the length of the baseline, $\lambda$ is the wavelength of the transmitter signal and $\theta$ is the angle between the baseline and the range vector to the grid point.

8. A method as recited in claim 7 wherein the computation of said least squares convergence is determined in accordance with the convergence function:

$$\hat{x}_{n+1}=\hat{x}_n+\overline{\Delta x}$$

in which $\hat{x}_n$ represents a predicted value for the unknowns comprising coordinates X and Y of the transmitter and the unknown constant $\emptyset_0$, $\hat{x}_{n+1}$ is the next predicted value for said unknowns after adding the corrections $\overline{\Delta x}=\{\Delta X, \Delta Y, \Delta\emptyset_0\}$, and in which $$\overline{\Delta x}=(H^TR^{-1}H)^{-1}H^TR^{-1}\overline{z}$$

in which H is a matrix of partial derivatives of the unknowns in the expression for determining the estimated values $\hat{\emptyset}_I$, and R is the covariance matrix of the phase measurements and $\overline{z}$ is a vector of the residual differences between the phase measurement $\emptyset$ and the predicted phase measurement $\hat{\emptyset}$, using the coordinates of the selected grid point as the starting values of X and Y in said convergence function and correcting the values of $\hat{x}_n$ with $\overline{\Delta x}$ until $\hat{x}_n+\overline{\Delta x}$ converges.

9. A method as recited in claim 6, wherein said least squares conversion is determined in accordance with the convergence function:

$$\hat{x}_{n+1}=\hat{x}_n+\overline{\Delta X}$$

in which $\overline{x}$ represents values for set of unknowns including the coordinates of the transmitter and an unknown constant $\emptyset_0$ in the equation for the phase differences being measured:

$$\phi = f(\overline{x}) = \left[ \phi_o - \frac{2\pi L}{\lambda} \cos\theta \right] \bmod 2\pi,$$

$\hat{x}_n$ represents predicted values for said unknowns, $\hat{x}_{n+1}$ represents the next predicted values for said unknowns after adding the corrections:

$$\overline{\Delta x}=\{\Delta X, \Delta Y, \Delta\emptyset_0\}$$

in which $\overline{\Delta x}$ is computed from $$\overline{\Delta x}=(H^TR^{-1}H)^{-1}H^TR^{-1}\overline{z}$$

in which $$H \equiv \frac{\partial}{\partial \overline{x}} f(\overline{x})\Big|_{\hat{\overline{x}}}$$

R is the covariance matrix of the phase measurements and $\overline{z}$ is a vector of the residual differences between the phase difference measurements $\emptyset$ and the predicted measurements $\hat{\emptyset}$ at each measurement point.

10. A method for determining the location of a transmitter transmitting a signal having a wavelength comprising receiving said signals with receivers separated by a baseline longer than said wavelength, detecting successive phase differences in the phases of the signals received by signal receivers as said platform moves through a measurement path, said phase difference measurements being the phase differences at successive measurement points distributed along said measurement path, said computer means determining the location of said transmitter with a computer by least squares convergence, said least squares conversion being determined in accordance with the convergence function:

$$\hat{x}_{n+1}=\hat{x}_n+\overline{\Delta x}$$

in which $\overline{x}$ represents values for set of unknowns including the coordinates of the transmitter and an unknown constant $\emptyset_0$ in the equation for the phase differences being measured, $$\phi = f(\overline{x}) = \left[ \phi_o - \frac{2\pi L}{\lambda} \cos\theta \right] \bmod 2\pi,$$

$\hat{x}_n$ represents predicted values for said unknowns, $\hat{x}_{n+1}$ represents the next predicted values for said unknowns after adding the corrections, $$\overline{\Delta X}=\{\Delta X, \Delta Y, \Delta\emptyset_0\},$$

in which $\overline{\Delta x}$ is computed from $$\overline{\Delta x}=(H^TR^{-1}H)^{-1}H^TR^{-1}\overline{z}$$

in which $$H \equiv \frac{\partial}{\partial \overline{x}} f(\overline{x})\Big|_{\hat{\overline{x}}}$$

R is the covariance matrix of the phase measurements and $\overline{z}$ is a vector of the residual differences between the phase difference measurements $\emptyset$ and the predicted measurements $\hat{\emptyset}$ at each measurement point.

* * * * *